Sept. 30, 1969    R. E. MIDDLETON    3,469,501
BYPASS SYSTEM FOR CONTROL SURFACE ACTUATOR CYLINDERS
Filed Feb. 9, 1968    3 Sheets-Sheet 1

INVENTOR
RALPH E. MIDDLETON
BY
ATTORNEY

Sept. 30, 1969  R. E. MIDDLETON  3,469,501
BYPASS SYSTEM FOR CONTROL SURFACE ACTUATOR CYLINDERS
Filed Feb. 9, 1968  3 Sheets-Sheet 3

INVENTOR
RALPH E. MIDDLETON

BY *Harvey S. Boyd*

ATTORNEY

United States Patent Office 3,469,501
Patented Sept. 30, 1969

3,469,501
BYPASS SYSTEM FOR CONTROL SURFACE ACTUATOR CYLINDERS
Ralph E. Middleton, Bremerton, Wash., assignor to the United States of America as represented by the Secretary of the Army and/or the Administrator of the Federal Aviation Agency
Filed Feb. 9, 1968, Ser. No. 706,747
Int. Cl. F15b 13/06
U.S. Cl. 91—411                    2 Claims

ABSTRACT OF THE DISCLOSURE

This invention relates to hydraulic operation of control surfaces on aircraft and more particularly to a method and apparatus for bypassing parallel actuator cylinders for a control surface responsive to the power requirement. By more efficient use of multiple actuators the bypass will operate to reduce the hydraulic horsepower requirement for displacement of the control surface.

BACKGROUND OF THE INVENTION

Field of the invention

The method of this invention depends on a two part bypass valve connected between the main servo spool valve and a plurality of actuating cylinders for a single aircraft control surface. The valve system operates to bypass preselected cylinders based upon the pressure differential at the main servo spool.

Description of the prior art

In order to minimize the cylinder size to operate control surfaces in the case where the power requirements vary widely and the control forces are high, several cylinders are utilized in place of a single actuator. This is particularly important in the supersonic jet transport where the wing thickness requires a minimum cylinder diameter.

By using a plurality of smaller cylinders in place of a single actuator a more even force distribution on the control surface is facilitated. However, a plurality of cylinders penalizes the hydraulic system at low speeds where the force required to control the surface is low, but the displacement of the surface required or rate of movement is large, for example, in landing and taking off. High control rates and high loads do not occur simultaneously, However, servo design requires sizing the hydraulic system to handle both.

SUMMARY

The bypass valve system of this invention comprises several embodiments of the basic concept. The pressure requirement from the main servo valve is designed to operate directly on one or more actuating cylinders which are never bypassed. The remaining cylinders may be bypassed, individually integrated into the control system or, in a separate embodiment, integrated simultaneously. The invention provides for either a single step or multiple step control of a surface responsive to the power requirement.

Accordingly, it is an object of this invention to provide a bypass valve intermediate a pressure source and one or more actuating cylinders.

It is another object to provide a valve for selectively operating cylinders responsive to the power requirement for a control surface.

It is a further object to provide a method of operating cylinder actuated control surfaces at less than maximum flow and force requirement using less than the maximum number of cylinders.

These and other objects will be apparent with reference to the following description and drawings.

DESCRIPTION OF THE PREFERRED EMBODIMENT

Figure 1:
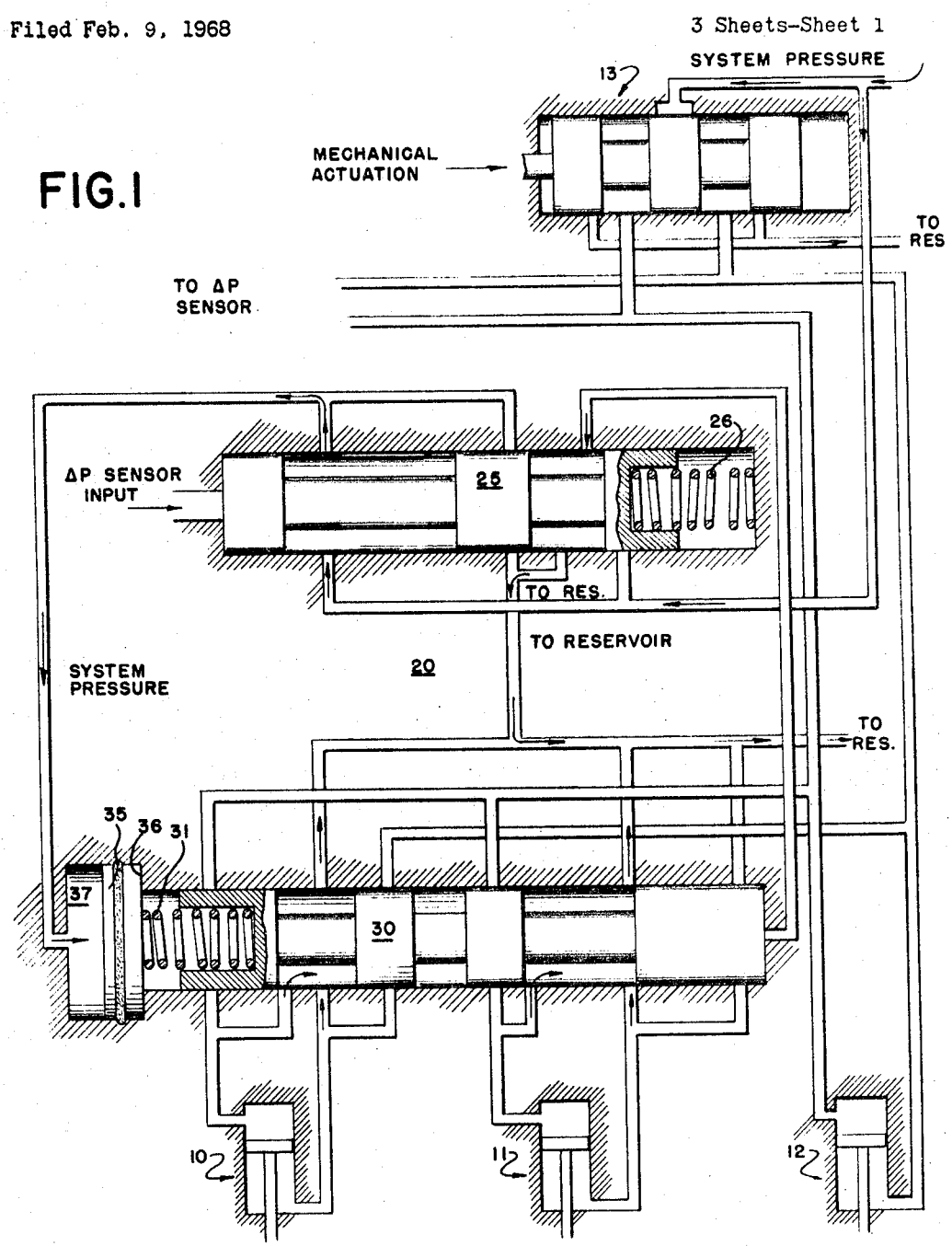
FIG. 1 is one embodiment of the two stage cylinder bypass of this invention.

As shown in the embodiment of FIG. 1 three actuator cylinders, 10, 11, and 12, are connected through the two stage bypass, 20, to the mechanically actuated main servo spool, 13. Cylinder, 12, operates directly from the main spool, 13, and the bypass, 20, controls when cylinders, 10, or, 11, are activated.

Bypass, 20, includes a first biased spool, 25, a second biased spool, 30, and a large diameter piston, 35. Spools, 25, and, 30, are normally urged in opposing directions by springs, 26, and, 31, respectively.

The working position of spool, 25, is fixed by the input from the pressure sensor responsive to the differential ($\Delta P$) at the spool of the main control servo valve, 13, as the result of the force being called for on the control surface. This force varies with the air speed and control surface position, and may be determined by a conventional envelope curve of control force required vs. air speed vs. control surface angle or angular rate of change. The envelope curve is unique for a particular aircraft, and the use of the curve and calculation of the force required are well known to those skilled in aircraft design.

Figure 2:
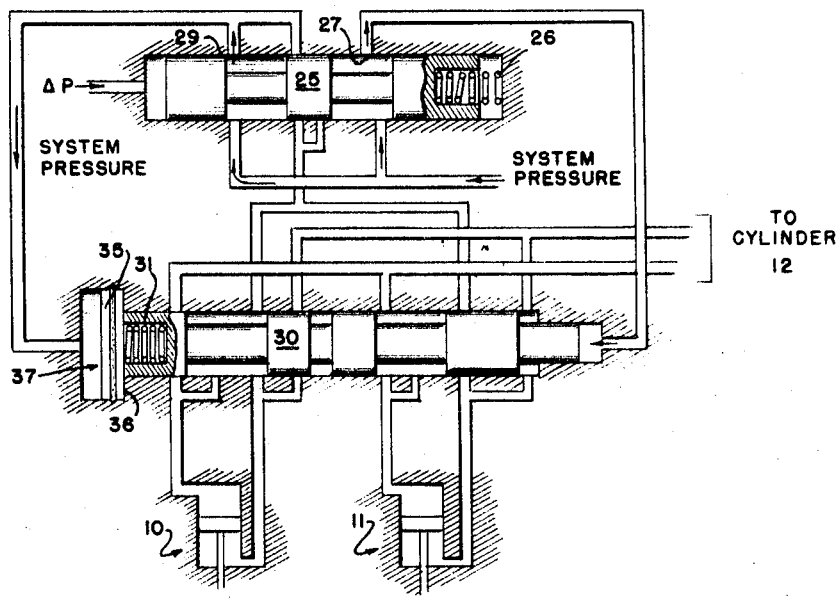
FIG. 2 is a partial view of the two stage bypass of FIG. 1 with one cylinder bypassed.
Figure 3:
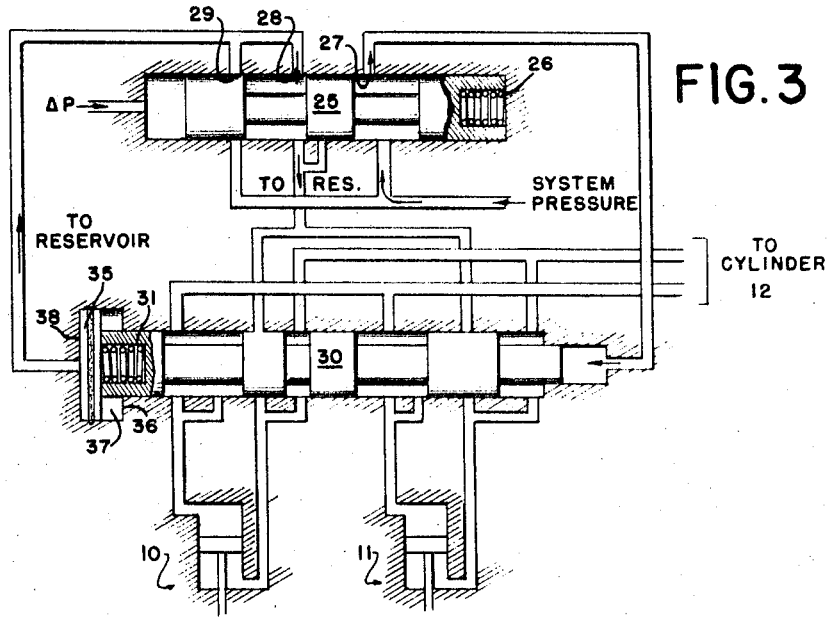
FIG. 3 is a partial view of the two stage bypass of FIG. 1 with all cylinders working.

In order to maintain a smooth transition between the modes of operation at, for example, a low $\Delta P$, intermediate $\Delta P$, and high $\Delta P$, in the embodiment of FIG. 1, the spool, 25, is designed with three distinct positions, as shown in FIGS. 1, 2, and 3.

Each position of spool, 25, low $\Delta P$ shown in FIG. 1, intermediate $\Delta P$ shown in FIG. 2 and high $\Delta P$ shown in FIG. 3, forces spool, 30, to a different working position.

In FIG. 1 a low $\Delta P$ input at spool, 25, causes negligible compression of spring 26. Spool, 30, is vented to return the hydraulic fluid to the system reservoir, and piston, 35, acted upon by the system pressure only is in rest position against wall, 36, of cylinder, 37. Spring, 31, then forces spool, 30 to block the flow from the main servo valve, 13, to cylinders, 10, and 11.

In the position of FIG. 1 the flow supplied to cylinder 12, is maximum, but the maximum control force is ⅓ of the maximum design force. The flow from the $\Delta P$ sensor to cylinder, 12, is modulated by the main servo control valve, 13, which is connected across the $\Delta P$ sensor. The $\Delta P$ sensor also supplies a signal to valve spool, 25, upon actuation of the main control valve, 13, but there is no flow through valve, 25, at a low $\Delta P$ input.

FIG. 2 shows only spools, 25, and, 30, piston, 35, and cylinders, 10, and, 11, during an intermediate range $\Delta P$ input to spool, 25. The increased $\Delta P$ causes a partial depression of spring, 26, as spool, 25, moves to open port, 27. System pressure still holds piston, 35, against wall, 36; however, system pressure is also fed to spool, 30, forcing it against spring, 31, until its compressive action is stopped by piston, 35.

Port, 27, then vents the system pressure from spool, 25, to spool, 30, connecting cylinder, 11, in parallel with cylinder, 12. In this position cylinder, 10, is still bypassed.

In the intermediate ΔP mode of operation the main servo spool, 13, feeds directly to cylinders, 11, and, 12. The maximum force available is now ⅔ of the design total, but the maximum flow to produce the surface angular rate is reduced ⅔ of the maximum design flow.

In FIG. 3 as in FIG. 2 an abbreviated view of the system of FIG. 1 is shown. FIG. 3 illustrates the mode of operation during a high ΔP input to spool, 25. A high ΔP input forces spool, 25, to compress spring, 26, openings port, 28, in addition to port, 27, while blocking port, 29. System pressure is then not admitted to cylinder, 37, and the cylinder is vented to return. System pressure is still fed to spool, 30, forcing the piston, 35, and spool, 30, laterally against wall, 38, of cylinder, 37. When piston, 35, moves against wall, 38, and spring, 31, is compressed cylinders, 10, and, 11, are both connected in parallel with cylinder, 12. In this mode of operation the maximum system flow is distributed to all three cylinders, and although the surface rate of movement is ⅓, the full design hinge force is applied to a control surface.

Figure 4:
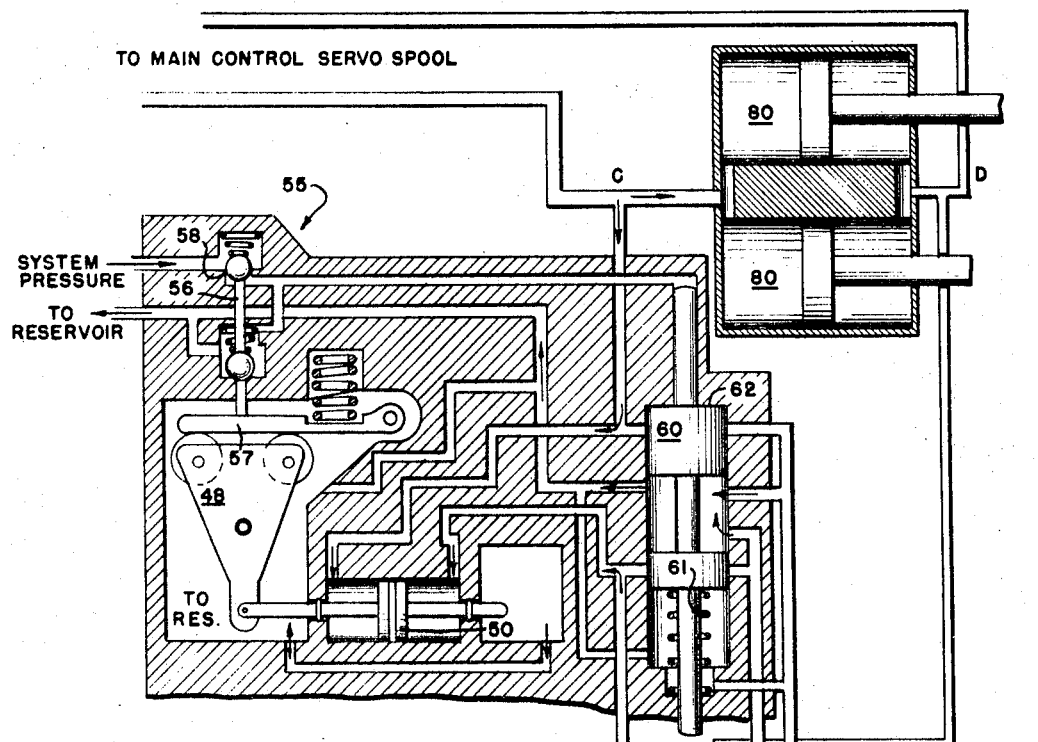
FIG. 4 is a second embodiment of the two stage bypass.

The embodiment of FIG. 4 was developed to meet the situation where because of a different envelope curve it is not necessary or desirable to provide two steps of change in the control force. While a total of three cylinders per system per surface is shown two or four or any number would obviously be feasible within the basic design. The bypassing provision would only be applied to one cylinder, and the others would always be connected in parallel with the main control servo spool, 13.

In providing only one step of change or two modes of operation the bypass valve action is simplified. A mechanical linkage is interposed between a ΔP sensing piston, 50, and the bypass valve.

The bypass valve is a two section unit. The first section, 55, is a three way valve operated by a plunger, 56, which displaces responsive to a biased lever, 57.

When the ΔP input is low, cam, 48, is in a neutral position and plunger, 56, closes port, 58, as shown in FIG. 4. When port, 58, is closed system pressure is blocked from spool, 60, and the lands of spool, 60, are vented to return to the reservoir. Spring, 61, then urges spool, 60, against stop, 62. In this position flow from the external main servo spool is blocked from cylinder, 70, and the cylinder's ports are interconnected and vented to return. Cylinder, 70, is then bypassed.

Figure 5:
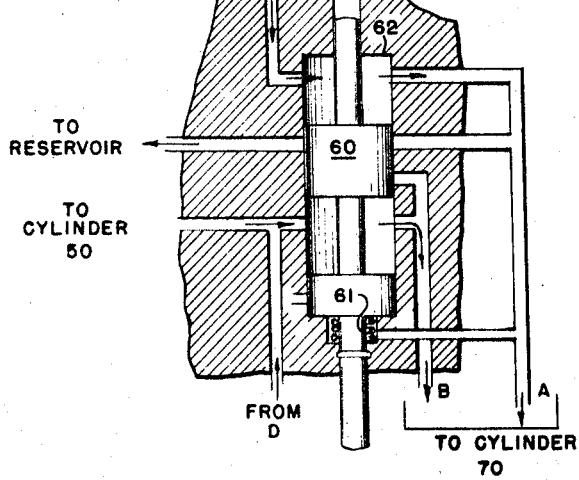
FIG. 5 is a view of the spool valve of FIG. 4 wherein the valve is depressed to actuate another cylinder.

When the ΔP input is increased, the ΔP sensing piston, 50, moves laterally to rotate the cam, 48, which lifts lever, 57, and moves plunger, 56, to open port, 58, and admit system pressure into spool, 60. This forces spool, 60, to compress spring, 61, as shown in FIG. 5, connecting cylinder, 70, in parallel with cylinders, 80, which independently work responsive to the external main servo valve.

It will be obvious to one of ordinary skill in the art that the function of spool, 60, may also be accomplished through the use of the spring biased spool, 25, of FIG. 1. The basic principle of the bypass system of this invention may also be modified by replacing the mechanical linkage of FIG. 4 with the all hydraulic system of FIG. 1 in order to tailor the operating range to the control requirements.

I claim:
1. A hydraulic actuator system for an aircraft control surface comprising:
(a) a first actuator cylinder connected to the control surface;
(b) first and second pressure supply means;
(c) said first pressurse supply means normally communicating with said first cylinder for supplying fluid under pressure to said cylinders;
(d) a second actuator cylinder operably connected, to said control surface;
(e) control force sensing means for emitting a pressure signal responsive to the force necessary to actuate said control surface;
(f) a first biased spool valve, said valve having a first port for fluid admission communicating with said first pressure supply means and a second port communicating with said second cylinder, said spool normally closing the ports, said second pressure supply means moving said first valve to open the ports; and
(g) a normally closed, second biased valve connecting said second pressure supply means and said first valve, said second valve having a normally closed position, and an open position, said second valve opening responsive to a preselected signal from said force sensing means to place said second pressure means in communication with said first valve, moving said first valve to open said ports, so that when said force sensing means causes said first valve to open the ports said first pressure supply means actuates said second cylinder.

2. A hydraulic actuator system for an aircraft control surface comprising:
(a) a first actuator cylinder connected to the control surface;
(b) a first pressure supply means normally communicating with said first cylinder for supplying fluid under pressure to said first cylinder;
(c) a second actuator cylinder operably connected to said control surface;
(d) control force sensing means for emitting a pressure signal responsive to the force necessary to actuate said control surface;
(e) a second pressure supply means;
(f) a third actuator cylinder operably connected to said control surface;
(g) a first biased spool valve selectively communicating with said second pressure supply means and with said force sensing means;
(h) a second biased spool valve selectively communicating at said spool with the first spool valve and said second and third cylinders for selective communication between said first pressure supply means and said second and third cylinders; and
(i) a spool driving cylinder, the piston of said cylinder resiliently attached to the spool of said second spool valve, said cylinder communicating with said second pressure supply means through said first spool, said second pressure supply means selectively driving said piston responsive to the displacement of said first spool valve; so that when said first spool valve receives a preselected signal from said force sensing means said first spool admits fluid under pressure from said second pressure supply means to said second spool, displacing said spool, and fluid under pressure from said first pressure supply means to said second spool, said second spool admitting the fluid to drive said second actuator cylinder; said first spool selectively driving said piston to displace said second spool and admit fluid from said first pressure supply means to drive said third actuator cylinder in response to a further signal from said force sensing means.

References Cited
UNITED STATES PATENTS 2,370,526  2/1945  Doran.
2,616,264  11/1952  Grant et al. _____ 91—412
3,190,185  6/1965  Rasmussen.

EDGAR W. GEOGHEGAN, Primary Examiner

U.S. Cl. X.R.
91—412